(12) United States Patent
Richter et al.

(10) Patent No.: US 12,132,934 B2
(45) Date of Patent: *Oct. 29, 2024

(54) OPERATION METHOD OF ELECTRONIC DEVICE FOR ENCODING AND DECODING A SEQUENCE OF PICTURES USING A BUFFERED TRANSFORM SIGNAL APPROXIMATION

(71) Applicant: Fraunhofer-Gesellschaft zur Förderung der angewandten Forschung e.V., Munich (DE)

(72) Inventors: Thomas Richter, Erlangen (DE); Wolfgang Heppner, Erlangen (DE); Joachim Keinert, Erlangen (DE); Siegfried Fößel, Erlangen (DE); Herbert Thoma, Erlangen (DE); Christian Scherl, Erlangen (DE); Christian Minuth, Erlangen (DE); Bilal Ahmed, Erlangen (DE); Nisha Bhaskar, Erlangen (DE); Heiko Sparenberg, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,372

(22) Filed: Jul. 5, 2023

(65) Prior Publication Data

US 2023/0353787 A1 Nov. 2, 2023

Related U.S. Application Data

(63) Continuation of application No. 17/576,064, filed on Jan. 14, 2022, now Pat. No. 11,736,731.

(51) Int. Cl.
*H04N 19/64* (2014.01)
*H04N 19/105* (2014.01)
(Continued)

(52) U.S. Cl.
CPC ......... *H04N 19/647* (2014.11); *H04N 19/105* (2014.11); *H04N 19/172* (2014.11); *H04N 19/18* (2014.11)

(58) Field of Classification Search
None
See application file for complete search history.

(56) References Cited

U.S. PATENT DOCUMENTS 6,480,547 B1 * 11/2002 Chen ...................... H04N 19/29
375/E7.033
9,036,890 B2 5/2015 Borg et al.
(Continued)

OTHER PUBLICATIONS

Non-Final Office Action dated Aug. 24, 2023, issued in application No. U.S. Appl. No. 17/576,095 (copy not provided).
(Continued)

*Primary Examiner* — Chikaodili E Anyikire
(74) *Attorney, Agent, or Firm* — McClure, Qualey & Rodack, LLP

(57) ABSTRACT

An apparatus for decoding a sequence of pictures from a data stream is configured for decoding a picture of the sequence by deriving a residual transform signal of the picture from the data stream; combining a residual transform signal with a buffered transform signal approximation of a previous picture of the sequence so as to obtain a transform signal representing the picture, the transform signal having a plurality of transform coefficients; and subjecting the transform signal to a spectral-to-spatial transformation. The apparatus is configured for deriving the buffered transform signal approximation from a further transform signal representing the previous picture so that the buffered transform
(Continued)

signal approximation has approximations of further transform coefficients of the further transform signal.

32 Claims, 8 Drawing Sheets

(51) Int. Cl.
*H04N 19/172* (2014.01)
*H04N 19/18* (2014.01)

(56) References Cited

U.S. PATENT DOCUMENTS

| | | |
|---|---|---|
| 2011/0299592 A1 | 12/2011 | Fujita |
| 2018/0176582 A1 | 6/2018 | Zhao et al. |
| 2020/0359025 A1 | 11/2020 | Naser et al. |
| 2021/0136373 A1 | 5/2021 | De Luxan Hernandez et al. |

OTHER PUBLICATIONS

International Standard; "ISO/IEC 21122-1 Information technology—JPEG XS low-latency lightweight image coding system—Part 1—Core coding system;" 2021; pp. 1-108.
Ohm, J.R., et al.; "ISO/IEC 14496-2 Information technology—Coding of Audio-visual Objects—Part 2—Visual_2003;" Mar. 2003; pp. 1-745.
International Search Report and Written Opinion dated Mar. 27, 2023, issued in application No. PCT/EP2023/050858.
Kazui, K. et al.; "Video coding technology proposal by Fujitsu;" Jointcollaborative Team on Video Coding of ISO/IEC JTC1/SC29/WG11 and ITU-TSG.16; Apr. 2010; pp. 1-23; figure 1.
Koyama, J. et al.; "Coefficient sign bit compression in video coding;" 2012 Picture Coding Symposium; May 2012; pp. 385-388; figure 3.
Descampe, A. et al.; "JPEG XS-A New Standard for Visually Lossless Low-Latency Lightweight Image Coding", Proceedings of the IEEE, IEEE.; vol. 109; No. 9; May 2021; pp. 1559-1577.
Non-Final Office Action dated Mar. 15, 2024, issued in application No. U.S. Appl. No. 18/347,354 (copy not provided).

* cited by examiner

OPERATION METHOD OF ELECTRONIC DEVICE FOR ENCODING AND DECODING A SEQUENCE OF PICTURES USING A BUFFERED TRANSFORM SIGNAL APPROXIMATION

CROSS-REFERENCE TO RELATED APPLICATION

This application is a continuation of U.S. application Ser. No. 17/576,064, filed Jan. 14, 2022, now U.S. Pat. No. 11,736,731, which is incorporated herein by reference in its entirety.

TECHNICAL FIELD

Embodiments of the present invention relate to an apparatus for decoding a sequence of pictures and an apparatus for encoding a sequence of pictures. Further embodiments relate to a method for decoding a sequence of pictures a method for encoding a sequence of pictures. Further embodiments relate to computer programs for performing same methods. Further embodiments relate to a data stream obtained by the method for encoding a sequence of picture. Some embodiments relate to a temporal prediction from bitplane counts for image sequence coding.

BACKGROUND OF THE INVENTION

When transmitting sequences of images or pictures, such as captured by a camera or as a sequence of screen captures of the desktop of a computer screen, only limited bandwidth is available to transport this information. To address this problem, the image data may be compressed in a lossy way, by first including transformations that exploit both spatial and temporal correlations within the source data, and then by quantizing and encoding the created coefficients of the decorrelation transformation. To enable temporal prediction, e.g. prediction using previous frames (i.e. previous pictures), both the encoder and the decoder need to hold data of past frames, in a unit denoted as "frame buffer". In FPGA implementations, this creates the additional burden of having to transport larger amounts of data both from the data source, e.g. the camera or the computer desktop, and the frame buffer at the same time. Since bandwidth between the source, the frame buffer and the processing device is also a limiting factor, keeping a full sized frame buffer may not be possible.

SUMMARY

Accordingly, a video coding concept would be desirable, which provides an enhanced tradeoff between a good rate-distortion-relation (a ratio between the rate, e.g. the size of the data into which the sequence is coded, and the distortion, e.g. the loss of information or quality) of the coded video data and low buffer requirements (e.g. a low size of a buffer required for encoding or decoding the sequence of pictures).

An embodiment may have an apparatus for decoding a sequence of pictures from a data stream, wherein the apparatus is configured for decoding a picture of the sequence by deriving a residual transform signal of the picture from the data stream, combining the residual transform signal with a buffered transform signal approximation of a previous picture of the sequence so as to obtain a transform signal representing the picture, the transform signal having a plurality of transform coefficients, and subjecting the transform signal to an inverse wavelet transformation or an inverse frequency transformation, and deriving the buffered transform signal approximation from a further transform signal representing the previous picture so that the buffered transform signal approximation has approximations of further transform coefficients of the further transform signal.

Another embodiment may have an apparatus for encoding a sequence of pictures into a data stream, wherein the apparatus is configured for encoding a picture of the sequence by subjecting a spatial representation of the picture to a wavelet transformation or a frequency transformation so as to obtain a transform signal representing the picture, the transform signal having a plurality of transform coefficients, deriving a residual transform signal based on a buffered transform signal approximation of a previous picture of the sequence and the transform signal, and encoding the residual transform signal of the picture into the data stream, and deriving the buffered transform signal approximation from a further transform signal representing the previous picture so that the buffered transform signal approximation has approximations of further transform coefficients of the further transform signal.

According to another embodiment, a method for decoding a sequence of pictures from a data stream, wherein the method may have the steps of: decoding a picture of the sequence by deriving a residual transform signal of the picture from the data stream, combining a residual transform signal with a buffered transform signal approximation of a previous picture of the sequence so as to obtain a transform signal representing the picture, the transform signal having a plurality of transform coefficients, and subjecting the transform signal to an inverse wavelet transformation or an inverse frequency transformation, and deriving the buffered transform signal approximation from a further transform signal representing the previous picture so that the buffered transform signal approximation has approximations of further transform coefficients of the further transform signal.

According to another embodiment, a method for encoding a sequence of pictures into a data stream, wherein the method may have the steps of: encoding a picture of the sequence by subjecting a spatial representation of the picture to a wavelet transformation or a frequency transformation so as to obtain a transform signal representing the picture, the transform signal having a plurality of transform coefficients, deriving a residual transform signal based on a buffered transform signal approximation of a previous picture of the sequence and the transform signal, and encoding the residual transform signal of the picture into the data stream, and deriving the buffered transform signal approximation from a further transform signal representing the previous picture so that the buffered transform signal approximation has approximations of further transform coefficients of the further transform signal.

Another embodiment may have a non-transitory digital storage medium having a computer program stored thereon to perform the method for decoding a sequence of pictures from a data stream, wherein the method may have the steps of: decoding a picture of the sequence by deriving a residual transform signal of the picture from the data stream, combining a residual transform signal with a buffered transform signal approximation of a previous picture of the sequence so as to obtain a transform signal representing the picture, the transform signal having a plurality of transform coefficients, and subjecting the transform signal to an inverse wavelet transformation or an inverse frequency transformation, and deriving the buffered transform signal approxima-tion from a further transform signal representing the previous picture so that the buffered transform signal approximation has approximations of further transform coefficients of the further transform signal, when said computer program is run by a computer.

Still another embodiment may have a non-transitory digital storage medium having a computer program stored thereon to perform the method for encoding a sequence of pictures into a data stream, wherein the method may have the steps of: encoding a picture of the sequence by subjecting a spatial representation of the picture to a wavelet transformation or a frequency transformation so as to obtain a transform signal representing the picture, the transform signal having a plurality of transform coefficients, deriving a residual transform signal based on a buffered transform signal approximation of a previous picture of the sequence and the transform signal, and encoding the residual transform signal of the picture into the data stream, and deriving the buffered transform signal approximation from a further transform signal representing the previous picture so that the buffered transform signal approximation has approximations of further transform coefficients of the further transform signal, when said computer program is run by a computer.

Another embodiment may have a non-transitory computer-readable medium having stored thereon a data stream having encoded thereinto a sequence of pictures, wherein the sequence of pictures is encoded into the data stream using the method for encoding a sequence of pictures into a data stream, wherein the method may have the steps of: encoding a picture of the sequence by subjecting a spatial representation of the picture to a wavelet transformation or a frequency transformation so as to obtain a transform signal representing the picture, the transform signal having a plurality of transform coefficients, deriving a residual transform signal based on a buffered transform signal approximation of a previous picture of the sequence and the transform signal, and encoding the residual transform signal of the picture into the data stream, and deriving the buffered transform signal approximation from a further transform signal representing the previous picture so that the buffered transform signal approximation has approximations of further transform coefficients of the further transform signal.

According to an embodiment, an apparatus for decoding a sequence of pictures from a data stream is configured for decoding a picture (e.g., a currently decoded picture) of the sequence by: deriving a residual transform signal of the picture from the data stream; combining a residual transform signal with a buffered transform signal approximation of a previous picture of the sequence (e.g., a picture (directly) preceding the currently decoded picture in the sequence) so as to obtain a transform signal representing the picture, the transform signal comprising a plurality of transform coefficients (e.g., the transform signal being independent from previous pictures); and subjecting the transform signal to a spectral-to-spatial transformation (e.g., an inverse frequency transformation). The apparatus is configured for deriving the buffered transform signal approximation from a further transform signal representing the previous picture so that the buffered transform signal approximation comprises approximations of further transform coefficients of the further transform signal (e.g., of some or all of the further transform coefficients included in the further transform signal).

According to another embodiment, an apparatus for encoding a sequence of pictures into a data stream is apparatus configured for encoding a picture (e.g., a currently coded picture) of the sequence by: subjecting a spatial representation of the picture to a spatial-to-spectral transformation (e.g., a wavelet transformation or a frequency transformation) so as to obtain a transform signal representing the picture, the transform signal comprising a plurality of transform coefficients (e.g., the transform signal being independent from previous pictures); deriving a residual transform signal based on a buffered transform signal approximation of a previous picture of the sequence (e.g., a picture (directly) preceding the currently decoded picture in the sequence) and the transform signal; and encoding the residual transform signal of the picture into the data stream. The apparatus is configured for deriving the buffered transform signal approximation from a further transform signal representing the previous picture so that the buffered transform signal approximation comprises approximations of further transform coefficients of the further transform signal (e.g., of some or all of a plurality of further transform coefficients included in the further transform signal). For example, the transform coefficients may comprise a plurality of transform coefficients, using which a transformed representation of the picture is represented, and, similarly or equivalently, the further transform signal may comprise a plurality of further transform coefficients, using which a transformed representation of the previous picture is represented.

Embodiments of the present invention rely on the idea of achieving a good rate-distortion relation in the encoding a transform signal, which represents the picture to be encoded in spectral components, by using an approximation of a buffered transform signal obtained from a previous picture so as to obtain a residual transform signal, the latter being encoded into the data stream. Accordingly, a correlation between subsequent pictures of the sequence of pictures, which may in examples be regarded as a temporal correlation, may be exploited for predicting the transform signal using the buffered transform signal approximation, so that the residual transform signal may have a lower data rate than the transform signal. In order to keep buffer requirements and the amount of processed and signaled data moderate, and nevertheless exploiting the advantage of such temporal prediction, approximations of further transform coefficients of the previous picture are buffered, which approximations may have a lower data rate than the further transform coefficients. In contrast to a temporal prediction performed on the untransformed pictures, i.e. in the spatial domain, prior to the spatial-to-spectral transformation (when referring to the encoder-side), examples of the herein disclosed concept may provide an efficient way of temporal prediction without buffering the further transform signal at full precision. In particular, the inventors realized, that compared to encoding transform coefficients without residual forming, an improvement in the rate-distortion-relation may already be achieved when using approximations of the further transform coefficients. The buffering of approximations of transform coefficients of the previous picture may allow for achieving a comparably high improvement of a rate-distortion relation of the encoded picture with a comparably moderate buffer size. These advantages equivalently apply to encoder- and decoder sides, as on decoder-side, the buffered transform signal approximation of the previous picture, which has been used for deriving the residual transform signal of the current picture on encoder-side, are buffered so as to determine the transform signal of the current picture based on the residual transform signal.

According to another embodiment, a method for decoding a sequence of pictures from a data stream has a step of decoding a picture of the sequence by: deriving a residual transform signal of the picture from the data stream; combining a residual transform signal with a buffered transform signal approximation of a previous picture of the sequence so as to obtain a transform signal representing the picture, the transform signal comprising a plurality of transform coefficients; and subjecting the transform signal to a spectral-to-spatial transformation. Further, the method has a step of deriving the buffered transform signal approximation from a further transform signal representing the previous picture so that the buffered transform signal approximation comprises approximations of further transform coefficients of the further transform signal.

According to another embodiment, a method for encoding a sequence of pictures into a data stream has a step of encoding a picture of the sequence by: subjecting a spatial representation of the picture to a spatial-to-spectral transformation so as to obtain a transform signal representing the picture, the transform signal comprising a plurality of transform coefficients; deriving a residual transform signal based on a buffered transform signal approximation of a previous picture of the sequence and the transform signal; and encoding the residual transform signal of the picture into the data stream. Further, the method has a step of deriving the buffered transform signal approximation from a further transform signal representing the previous picture so that the buffered transform signal approximation comprises approximations of further transform coefficients of the further transform signal.

According to another embodiment, a non-transitory digital storage medium has a computer program stored thereon to perform the method for decoding a sequence of pictures from a data stream.

According to another embodiment, a non-transitory digital storage medium has a computer program stored thereon to perform the method for encoding a sequence of pictures from a data stream.

According to another embodiment, a data stream has encoded thereinto a sequence of pictures, wherein the sequence of pictures is encoded into the data stream using the method for encoding a sequence of pictures into a data stream.

BRIEF DESCRIPTION OF THE DRAWINGS

Embodiments of the present invention will be detailed subsequently with respect to the appended drawings, in which.

DETAILED DESCRIPTION OF THE INVENTION

In the following, embodiments are discussed in detail, however, it should be appreciated that the embodiments provide many applicable concepts that can be embodied in a wide variety of video coding concepts. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Figure 1:
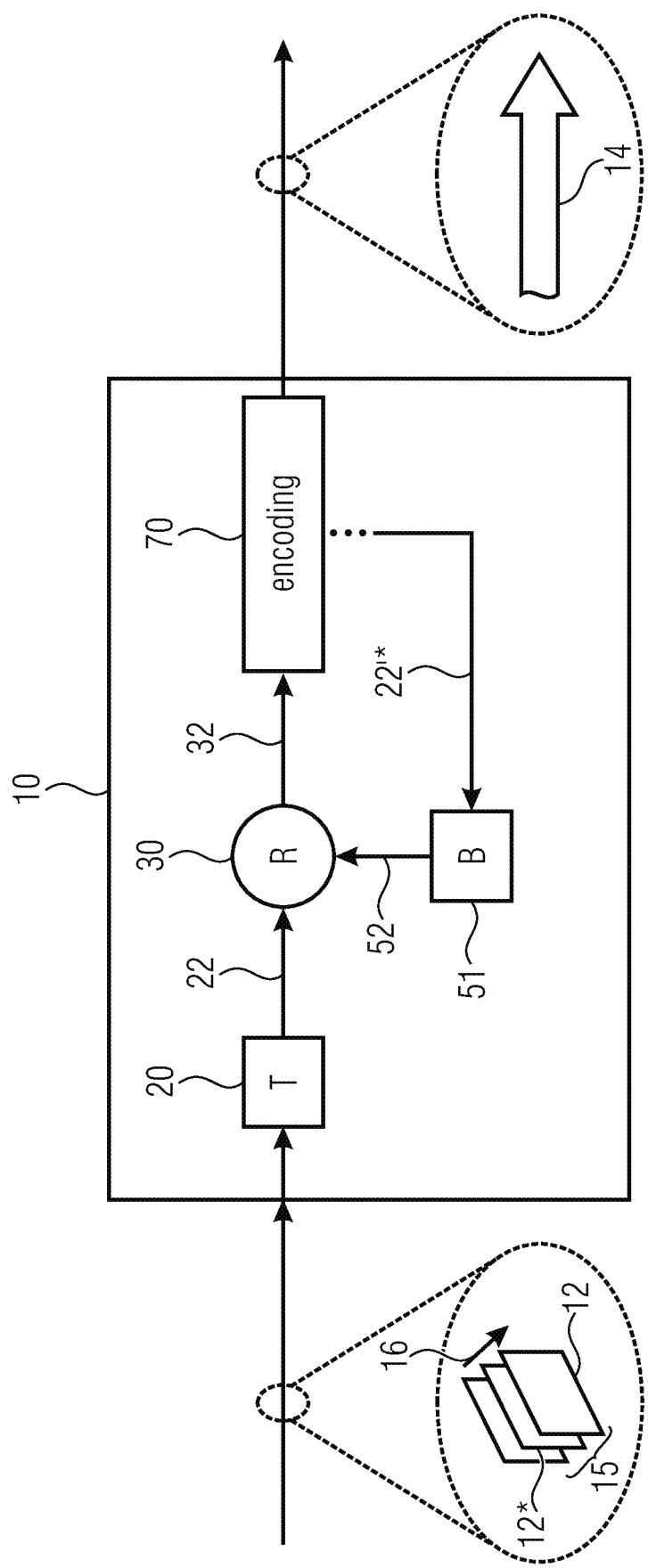
FIG. 1 illustrates an encoder according to an embodiment.
Figure 2:
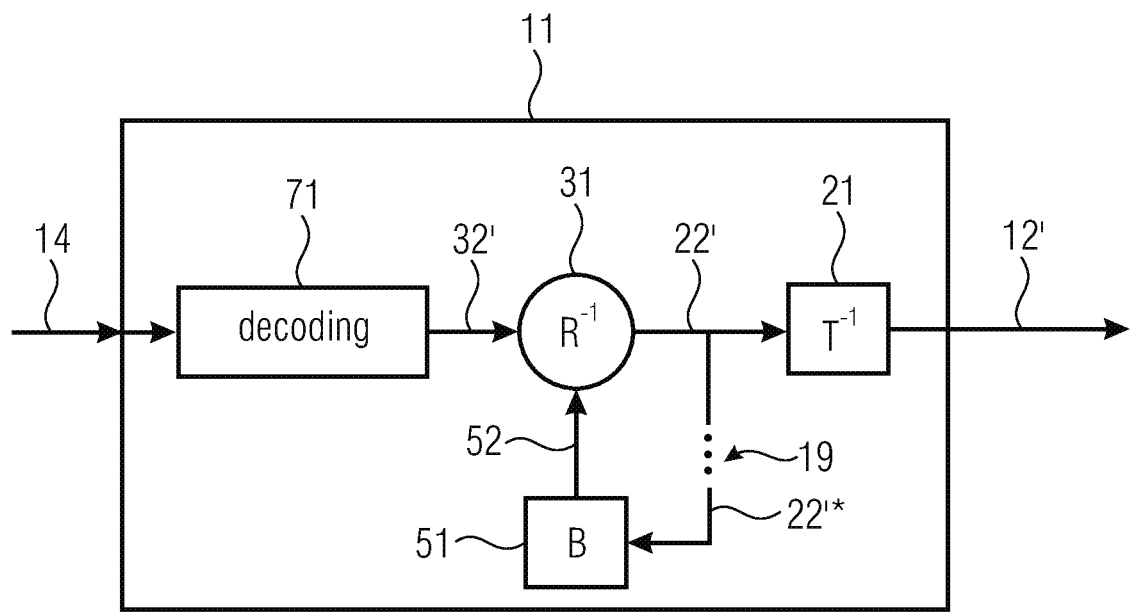
FIG. 2 illustrates a decoder according to an embodiment.

FIG. 1 illustrates an apparatus 10 for coding, or encoding, a sequence 15 of pictures into a data stream 14 according to an embodiment. Apparatus 10 may also be referred to as encoder 10. The pictures of sequence 15 may have an order 16, e.g. a temporal order or picture order. The sequence 15 comprises a picture 12, e.g. a picture to be currently coded, and a previous picture 12* preceding the picture 12 in the order 16 of the sequence 15. For example, the previous picture 12* is a picture which has been coded previously to the current picture 12, e.g., directly before the current picture 12, or a picture which precedes (e.g., directly) the picture 12 in the order 16. FIG. 2 illustrates a decoder 11, i.e. an apparatus 11 for decoding the sequence of pictures from the data stream 14 according to an embodiment.

In other words, decoder 11 is for reconstructing picture 12' from the data stream, wherein the apostrophe has been used to indicate that the picture 12' as reconstructed by the decoder 11 may deviate from picture 12 originally encoded by apparatus 10 in terms of coding loss, e.g. introduced by quantization. As the decoder 11 may perform the backward operation of encoder 10, some signals may equivalently appear in the encoding and decoding processes, although some signals on decoder side may differ from the respective signals on encoder side by coding loss. The following description makes reference to both FIGS. 1 and 2 and the description of signals may apply to both encoder- and decoder sides.

The encoder 10 comprises a transform module 20, configured for subjecting the picture 12, or more precisely, a spatial representation of the picture 12, which may, e.g., comprise one or more two-dimensional arrays comprising sample values of one or more components of the picture 12, to a spatial-to-spectral transformation so as to obtain a transform signal 22 of the picture 12. The encoder 10 further comprises a residual former 30, configured for deriving a residual transform signal 32 based on the transform signal 22 and a buffered transform signal approximation 52 of the previous picture 12*. The residual forming by residual former 30 may also be referred to as prediction of the transform single 22. For example, the residual former may derive, for one of the transform coefficients, a corresponding residual transform coefficient for the residual transform signal 32 using an approximation of a corresponding one of the further transform coefficients. The residual former 30 may, for example, use one of the approximations included in the buffered transform signal approximation 52 so as to determine a residual which represents a deviation between the transform signal 22 and the approximation. The encoder 10 further comprises an encoding module 70, configured for encoding the residual transform signal 32 into the data stream 14. For example, the encoding module may quantize the residual transform signal 22 and encode the quantized signal using entropy coding.

The decoder 11 comprises a decoding module 71, configured for deriving, or decoding, a residual transform signal 32' of the picture 12' from the data stream 14. As already mentioned the residual transform signal 32' may differ from the residual transform signal 32 encoded by encoder 10 in terms of coding loss. In other words, residual transform signal 32' may, despite of coding loss, correspond to residual transform signal 32. Despite of the coding loss, the descriptions provided herein for the residual transform signal 32 may equivalently apply to the residual transform signal 32' and vice versa.

The decoder 11 further comprises a residual combiner 31, configured for combining the residual transform signal 32' with the buffered transform signal approximation 52 of the previous picture 12\*, which, e.g., has been decoded (directly) previous to the picture 12\*. For example, the residual combiner 31 may perform the inverse of the operation performed by residual former 30. In other words, the transform signal 22 may be predicted on the basis of a transform signal of the previous picture 12\*, referred to as further transform signal. For example, residual former 30 may subtract the buffered transform signal approximation 52 from the transform signal 22, and residual combiner 31 may add the buffered transform signal approximation 52 to the residual transform signal 22. In other words, transform signal 22' may, despite of coding loss included in the residual transform signal 22' compared to the residual transform signal 32, correspond to transform signal 22. Therefore, despite of the coding loss, the descriptions provided herein for the transform signal 22 may equivalently apply to the transform signals 22' and vice versa, and the descriptions provided herein for the residual transform signal 32 may equivalently apply to the residual transform signals 32 and vice versa. In the following description, the apostrophes may be omitted, that is, e.g. the reference signs 12, 22, and 32 will refer to both signals on encoder- and decoder-side irrespective of coding loss.

The decoder 11 further comprises an inverse transform module 21, configured for subjecting the transform signal 22' to a spectral-to-spatial transformation. For example, the spectral-spatial-transformation is the inverse transformation of the spatial-to-spectral transformation applied to the picture 12 by transform module 20. For example, the spectral-to-spatial transformation results in a spatial representation of the picture 12', e.g. as described with respect to the encoder 10.

Encoder 10 and decoder 11 comprise a buffering module 51 for deriving the buffered transform signal approximation 52 from the transform signal representing the previous picture 12\*, which is referred to as the further transform signal 22\*. The buffered transform signal approximation comprises approximations of further transform coefficients comprised in the further transform signal 22\*, which may be referred to as buffered approximations. For example, decoder 11 may derive the further transform signal 22'\* of the previous picture as described for the transform signal 22' of the current picture. To ensure, that the prediction of the transform signal 22 is performed equivalently on encoder-side and decoder-side, the encoder 10 may derive the further transform signal 22'\* by deriving the further transform signal for the previous picture 12\* and, in implementations in which the encoding 70 is lossy, introducing, or including, the coding loss related to the encoding 70 to the further transform signal. For example, the encoder 10 may derive the further transform signal 22'\* as described with respect to FIG. 6. Accordingly, the buffered transform signal approximation 52 may be equivalent on encoder and decoder sides.

By predicting transform coefficients of the transform signal 22 using approximations of their corresponding further transform coefficients, transform coefficients which deviate little from their respective corresponding further transform coefficients may be represented in the residual transform signal 32 by particularly small residual transform coefficients, such allowing for a good rate-distortion-relation in the encoding step 70. Additionally, the approximations may be buffered and processed memory- and resource-efficiently. Accordingly, a tradeoff between the rate-distortion-relation and the buffer requirements may be controlled by choosing the accuracy of the buffered approximations.

In other words, according to embodiments of the invention, instead of buffering the full transform signal the basis for the prediction, namely the framebuffer, a smaller dataset is used, and thus the bandwidth required to access the frame buffer is reduced. The same data is also available at the decoder without additional complexity.

According to an embodiment, encoder 10 derives the transform signal 22 independent of previous pictures of the sequence of pictures. For example, the transform signal 22 is obtained non-predictively, e.g. without temporal prediction. Accordingly, in an embodiment, decoder 11 derives the reconstructed picture 12' from the transform signal 22' of the picture 12' independently of previous pictures of the sequence 15. For example, the result of the spectral-to-spatial transformation 21 may be independent of previous pictures. Avoiding a temporal prediction of the picture in the position domain (i.e. in a spatial representation or spatial domain), may allow small buffer sizes of the encoder 10 and decoder 11.

Figure 9:
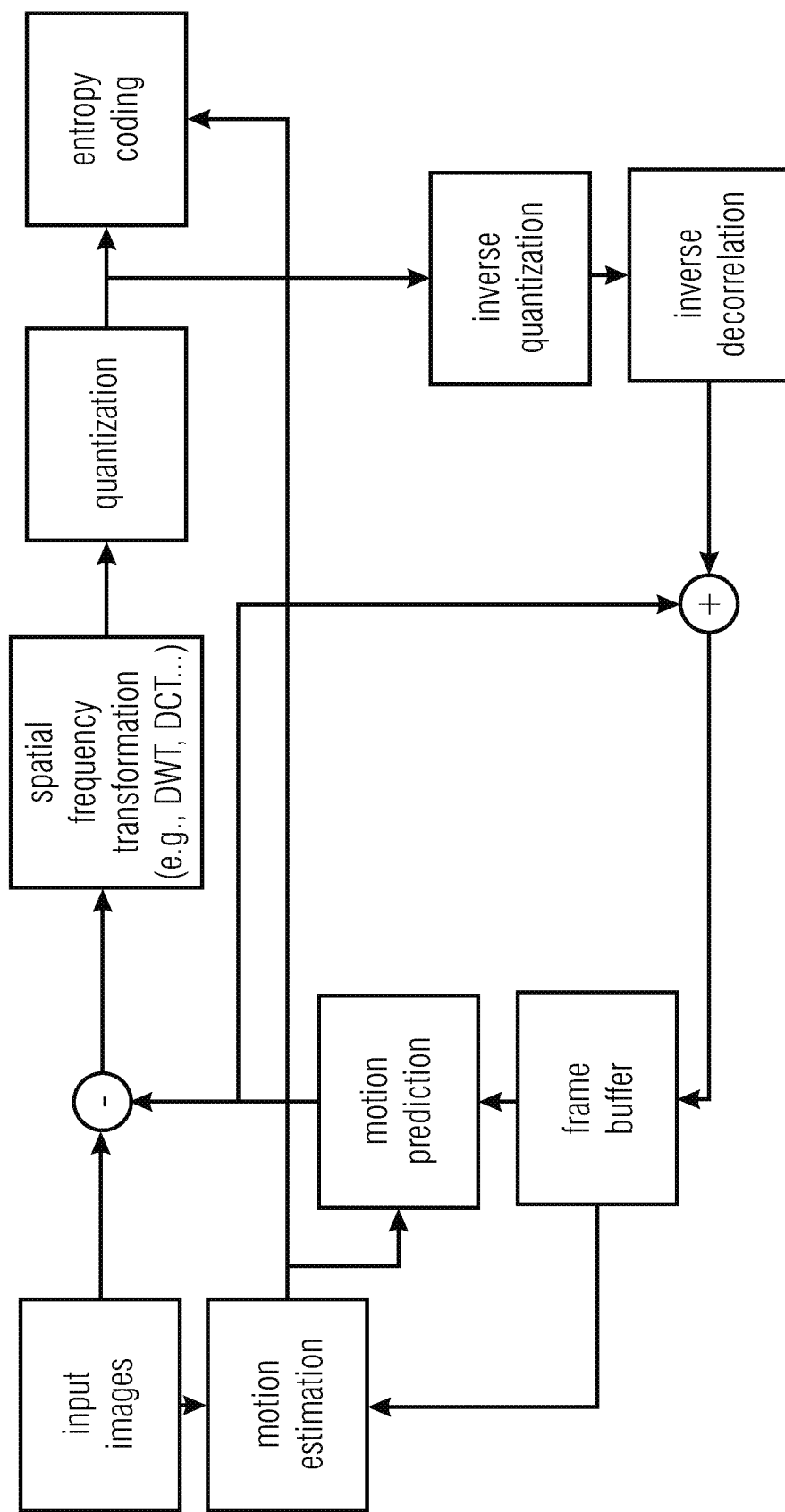
FIG. 9 illustrates an example of a coding scheme.

For example, in the existing schemes of video compression, due to prediction in the spatial domain, the encoder needs to include inverse quantization and inverse spatial decorrelation steps in order to model the decoder to follow the "closed loop" design, e.g. as described with respect to FIG. 9. Compared to these schemes, deriving the transform signal independent of previous pictures decreases the complexity of the encoder as not both, transformation and quantization, have to be run in both directions. For example, in the framework of JPEG XS, such a simplicity may be beneficial.

For example, embodiments of this invention may be applied in the framework of JPEG XS (e.g., ISO/IEC 21122-1), a lightweight still image compression codec that is particularly designed for low-complexity and low-latency applications, i.e. applications where only limited processing power is available, limited memory is available and image data shall be encoded and decoded only with minimal latency. Accordingly, embodiments of the invention may be implemented in accordance with JPEG XS, e.g. the inverse transform module 21, the residual combiner 31 and the encoding module 71.

As already mentioned with respect to FIG. 1 and FIG. 2, the encoder 10 and decoder 11 may derive the buffered transform signal approximation 52 from the further transform signal 22'\*, which represents the previous picture 12\*. Encoder 10 and decoder 11 may, derive the further transform signal 22*, for example, in the same manner as they derive the transform signal 22 of the current picture, except that, for the further transform signal the previous picture 12* is used as an input. In other words, the decoder 11 may decode the previous picture 12* so as to obtain the further transform signal 22*.

According to an embodiment, the decoder 11 decodes the previous picture 12* by decoding, by means of the decoding module 71, a residual transform signal of the previous picture, referred to as further residual transform signal, from the data stream 14. The further residual transform signal is input to the residual combiner 31, which combines the further residual transform signal with a further buffered transform signal approximation of an even further previous picture of the sequence so as to obtain the further transform signal 22'* of the previous picture 12*. The further transform signal represents the previous picture 12* in spectral components, e.g. as described for the transform signal for the current picture. The further transform signal is input to the inverse transformer 21, which subjects the further transform signal to the spectral-to-spatial transformation so as to obtain a spatial representation of the previous picture 12*.

Accordingly, the derivation process for the buffered transform signal approximation 52 may be illustrated as a loop, in which the further transform signal of the previous picture, which may have been in the same manner as the transform signal of the current picture is fed back for deriving the buffered transform signal approximation 52 for the derivation of the current picture. In the illustration of FIG. 2, reference sign 19 indicates the position of the loop, in which usage of reference signs switches between the derivation of the current picture and the previous picture.

It is noted, however, that the previous picture 12* is not necessarily decoded using the further buffered transform signal, but rather, the previous picture 12* may, in examples, e.g. for certain pictures such as the first picture of the sequence or a refresh picture or intra-coded picture, be decoded independently from the even further picture, or independently from any picture of the sequence preceding the previous picture. In this case, the step of combining performed by the residual combiner 31 may be skipped. Equivalently, for such a picture, encoder 10 may skip the step of predicting performed by residual former 30.

According to an embodiment, the transformation 20 comprises a discrete wavelet transformation (DWT), and the inverse transform 21 an inverse DWT. In examples, in this case, the transform signal 22 may comprise a plurality of spectral components, each of which being by a plurality of the transform coefficients. Each of the transform coefficients of a spectral component may further be associated with a spatial position within the picture. Therefore, it is noted, that the transform signal 22 may comprise, in addition to spectral information, also spatial information about the picture. The spectral components may also be referred to as bands or wavelet bands. Each of the spectral components may represent a respective frequency, or frequency band, along one of one or more transform directions, e.g. vertical or horizontal.

It is therefore noted, that the transform signal may comprise, in addition to spectral information, also spatial information about the picture. This may be particularly true for examples, in which a discrete wavelet transform (DWT) is used by transform module 20. Further examples of possible transformations are discrete sine transforms and discrete cosine transforms. Using a DWT may have the advantage, in particular over using sine or cosine transformations, that the transform signal may comprise a higher level of spatial information. This may be particularly beneficial in combination with performing the temporal prediction in the transform domain.

Figure 3:
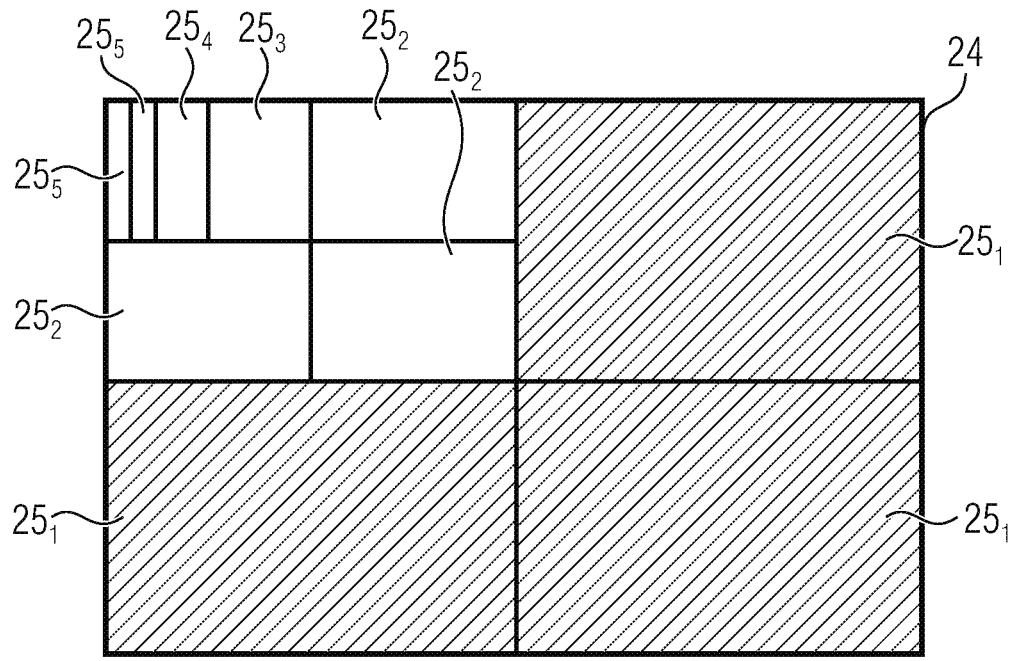
FIG. 3 illustrates an example of a transformed picture.

FIG. 3 illustrates an example of a transformed picture 24, as it may be represented by the transform signal 22 according to an embodiment. According to this embodiment, the transform module 20 performs a plurality, or a sequence, of DWTs on the picture 12, so as to obtain the transformed picture 24. For example, each of the DWTs is performed using a respective wavelet in a respective transform direction (e.g., horizontally or vertically). The transformed picture 24 comprises a plurality of transformed representations 25 of the picture 12, represented in FIG. 3 by transformed representations 251, 252, 253, 254, 255. Each of the transformed representations 25 is obtained by a respective number of one or more DWTs applied to the picture 12, or to a preceding transformed representation 25 when performed sequentially.

Each transformed representation 25 comprises a plurality of transform coefficients. For example, each transformed representation 25 may comprise a 2D array of transform coefficients, the coordinates of the transform coefficients within the transformed representation representing spatial information about the picture 12. The transformed representations 25, may have different sizes, i.e. different numbers of transform coefficients, depending on the number of subsequently applied DWTs and/or the used wavelets and/or the transform direction. In the illustrative example of FIG. 3, transformed representations 252 may have been derived from transformed representations 251 by horizontal and vertical DWTs, and transformed representations 253 may have been derived from one of the transformed representations 252 by means of a horizontal DWT.

Each of the transformed representations 25 may be associated with a respective spectral component, e.g. depending on the wavelet using which the transformed representation was obtained. For example each spectral component is characterized by, or associated with, a frequency and/or a transform direction of the respective wavelet. The size of the transformed representations 25, i.e. the number of transform coefficients of the transformed representations, may depend on a frequency associated with the transformed representations 25. To be more precise, a transformed representation 25 representing a low frequency spectral component may be represented by a lower number of transform coefficients than a transformed representation 25 representing a high frequency spectral component. For example, in FIG. 3, the shaded representations 251 may represent the highest out of the represented frequency bands.

For example, the transform 20 and the inverse transform 21 may be implemented in accordance with JPEG XS, which applies a discrete wavelet transformation ("DWT") as spatial decorrelation transformation. This transformation transforms image data into multiple bands (e.g. the above described spectral components), each of which corresponds to image structures of a particular scale, such that the largest bands contain information on the finest structure of the image, and the smallest bands contain information on the coarsest image structures. FIG. 3 depicts such a segmentation into wavelet bands. The shaded areas are the three largest bands, containing finest image structures.

With respect to the (inverse) transformation performed by the transform module 20, and the transform module 21, respectively, it is noted that in an alternative embodiment to the one described with respect to FIG. 3, a (inverse) discrete cosine transformation (DCT) or a (inverse) discrete sine transformation may be used. In this case, for example, the transformation by the transform module 20 may result in a transformed picture comprising a plurality of transform coefficients, each of which is associated with a respective frequency and transform direction. In this case, each of the transform coefficients may represent a different combination of frequency and transform direction, so that each transform coefficient may represent an individual spectral component. In this case, the picture may be subdivided in blocks prior to the transform 20, so that the transform signal may still include spatial information on the picture, however, to a lower extent compared to using a DWT.

Continuing with the description of FIG. 1 and FIG. 2, for example, the residual former may derive, for each of the transform coefficients, a corresponding residual transform coefficient for the residual transform signal 32 using an approximation of a corresponding one of the further transform coefficients. It is noted, however, the decoder 11 and encoder 10 may optionally, but do not necessarily buffer approximations of all further transform coefficients. For example, transform coefficients, for which no corresponding further transform coefficient is buffered, may be treated by setting the approximation of the corresponding further transform signal to a predetermined value, e.g. zero, for example in deriving the buffered transform signal approximation, or in the residual forming 30/residual combination 31.

Accordingly, in an embodiment, the residual combiner 31 is configured for combining the residual transform signal 32 with the buffered transform signal approximation 52 by combining mutually corresponding residual transform coefficients and buffered approximations. According to this embodiment, the residual former 30 predicts transform coefficients of the transform signal 22 using corresponding buffered approximations of the buffered transform signal approximation 52. For example, mutually corresponding coefficients are coefficients being associated with corresponding spectral components (e.g., resulting from an equivalent spatial-to-spectral transform with same frequency filter) and being associated with equivalent spatial coordinates, or being associated with corresponding spectral components and corresponding portions of the picture.

According to an embodiment, the residual former 30 determines a residual transform coefficient of the residual transform signal 32 by subtracting the corresponding buffered approximation from the corresponding transform coefficient of the transform signal 22. According to this embodiment, the residual combiner 31 determines a transform coefficient of the transform signal 22 by adding the corresponding buffered approximation to the corresponding residual transform coefficient of the residual transform signal 32.

In the following, embodiments of the buffering module 51 are described, which may optionally be implemented in the encoder 10 and decoder 11.

For example, the transform coefficients, or further transform coefficients, may be represented by means of respective binary representations. Throughout this description, the term binary representation may, for example, refer to a binary sign/magnitude representation, which represents a coefficient by means of a sign, and an absolute value (or magnitude), the absolute value being expressed as a binary number.

According to an embodiment, the buffering module 51 buffers, for one, or for each, of the buffered approximations, an indication of a sign of a binary sign/magnitude representation of the corresponding further transform coefficient. For example, the buffering module 51 may derive the approximation for one of the further transform coefficient by storing the sign.

The sign may allow for deriving an approximation of the further transform coefficient, e.g. by combining the sign with an approximation parameter, e.g. an empirically or statistically derived value, e.g. an average value of the further transform coefficient. For example, the approximation parameter may be specific to the spectral component and/or the position to which the further transform coefficient is associated. Accordingly, buffering the sign may allow for deriving a coarse approximation at low cost on buffer requirements.

According to an embodiment, encoder 10 encodes, and decoder 11 decodes, the transform signal 22, and accordingly the further transform signal, in units of coefficient groups, also referred to as code groups. Each coefficient group of the transform signal 22 comprises a plurality of the transform coefficients, and each coefficient group of the further transform signal 22* comprises a plurality of the further transform coefficients.

For example, encoding module 70 may subdivide the plurality of residual transform coefficients of the residual transform signal 32 into coefficient groups, and encode each of the coefficient groups into the data stream using a binary bitplane representation. Accordingly, decoding module 71 may decode the binary bitplane representations of the coefficient groups from the data stream 14 for deriving the residual transform signal 32.

For example, one coefficient group may include four (residual) transform coefficients, e.g. a number of 4 coefficients arranged adjacently in one line of a transformed representation of the picture, e.g. as illustrated in FIG. 3. In other examples, one coefficient group includes a 2×2 block of coefficients.

According an embodiment, in which the further transform coefficients are coded in units of coefficient groups, the buffering module 51 buffers, per coefficient group, an indication of a maximum significance, e.g. the maximum significance 76* described below with respect to FIG. 4, out of respective significances of the significant bits of bits of binary representations (e.g., binary sign/magnitude representations) of absolute values of the further transform coefficients of the coefficient group. For example, the maximum significance is buffered for all coefficient groups, the further transform coefficients of which are to be buffered, which may be all coefficient groups, or a selection of coefficient groups.

For example, in the binary representation, e.g. a binary I/O representation, a bit having a first value, e.g. one, may be referred to as a significant bit, while a bit having a second value may be referred to as insignificant bit. Further, each bit of a binary representation may be associated with a respective significance, which represents a position of the bit in an hierarchical order of the binary representation, or, in other words, the significance may be proportional to a value associated with a bit position of the binary representation.

In other words, the maximum significance 76* for the coefficient group may represent the maximum possible significance for which there is at least one significant bit within the entirety of all bits of binary representations of absolute values of the further transform coefficients of the coefficient group.

Figure 4:
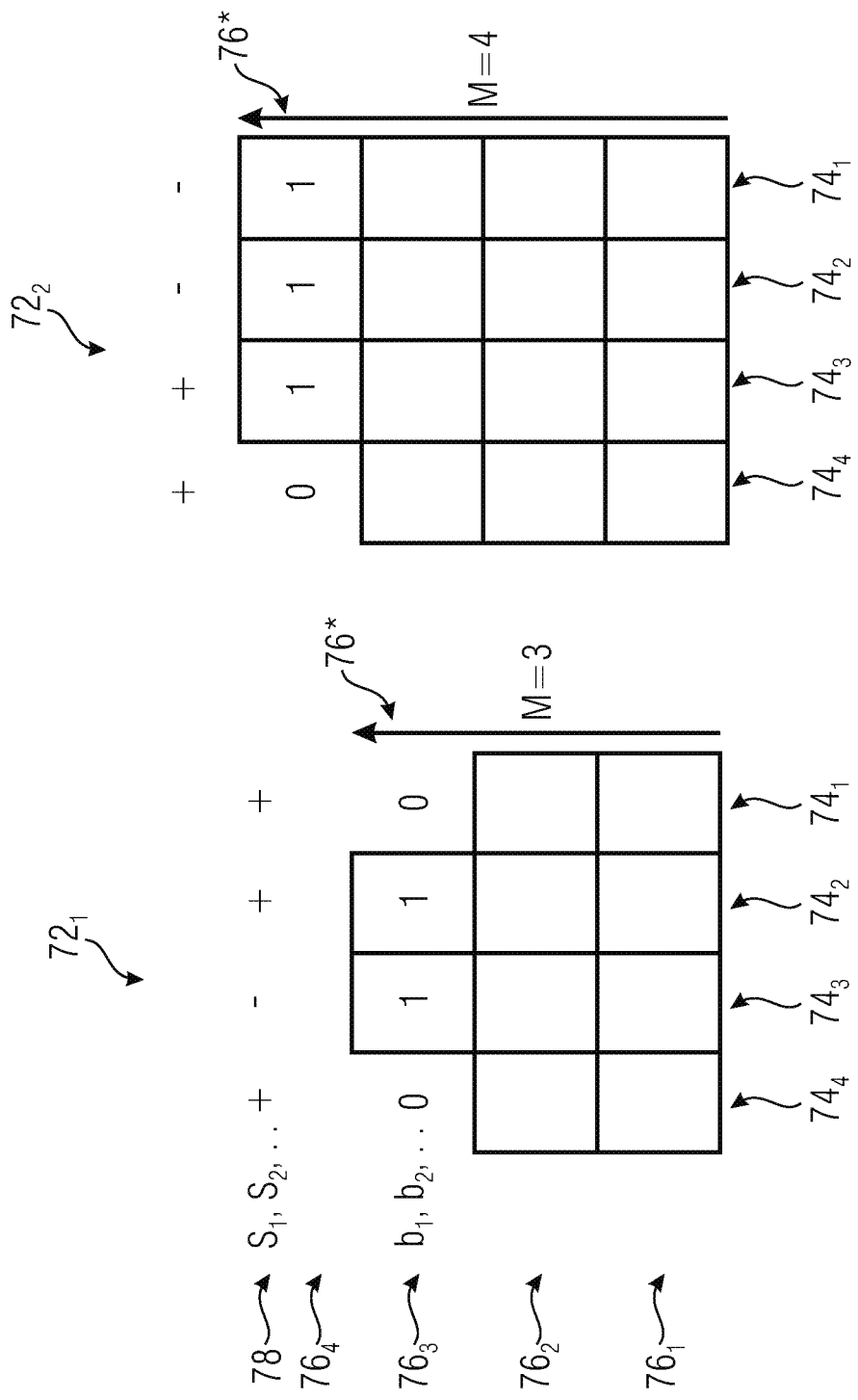
FIG. 4 illustrates examples of bitplane representations of coefficient groups.

FIG. 4 illustrates two examples of bitplane representations of coefficient groups $72_1$ and $72_2$, each comprising four coefficients 74, namely coefficients 741, 742, 743, and 744, e.g. further transform coefficients. For each of the coefficient 74, a binary sign/magnitude representation may comprise a sign 78, and bit values for number of bit planes 76, e.g. bitplanes $761$, $762$, $76_3$, $76_4$. Each bitplane comprises, for each of the coefficients 74 of the coefficient group, the bit having a significance which is associated with the bitplane. In other words, the bits of same significance of binary sign/magnitude representations of the coefficients 74 of the coefficient group 72, may be grouped into the same bitplane. In FIG. 4, only the values of the bits of the highest significant bitplane of each of the coefficient groups 72 are explicitly indicated. I.e., in coefficient group $72_1$, the bits of bitplane $76_4$ are all insignificant, e.g. zero. A bitplane may be referred to as significant or as populated, if it comprises at least one significant bit, and otherwise as insignificant or unpopulated. As in the above described binary representations, the significance is hierarchical. In FIG. 4, the significance increases from bitplane 761 to bitplane $76_4$. Accordingly, bitplane $76_3$ is the highest significant bitplane of coefficient group $72_1$, indicated by the parameter M, also referred to as bitplane count. As coefficient group $72_2$ has significant bits in bitplane $76_4$, namely those of coefficients 741 to 743, the highest significant bitplane of this coefficient group is bitplane $76_4$. Accordingly, in the example of FIG. 4, the maximum significance 76* out of respective significances of the significant bits of the coefficient group $72_1$, is the significance of bitplane $76_3$, or, in other words, the significance of the bits of coefficients 742 and 743, which bits are positioned in bitplane $76_3$.

Accordingly, the indication of the maximum significance 76* may provide information about all further transform coefficients of the coefficient group, namely an upper limit of a value of the further transform coefficient. Therefore, buffering the maximum significance 76* per coefficient group provides an efficient way in terms of buffer requirements, for buffering the approximations of the further transform coefficients. In particular, as the further transform coefficients of one coefficient group are positioned close, e.g. adjacent, to each other, their magnitude may be similar, so that the commonly buffered maximum significance 76* may provide a particularly high gain the rate-distortion-relation at a comparably low cost in buffering.

In other words, FIG. 4 illustrates two code groups of size 4 as an example, where the leftmost group has 3 populated bitplanes, and the rightmost group 4 populated bitplanes. The topmost line shows the signs of the coefficients, the digits in the topmost populated bitplane the bit values of the corresponding coefficients of the coding group. Note that the number of populated bitplanes is given by the magnitude of the largest coefficient of the coding group. For example, embodiments of the invention use the information contained in the sign bits (topmost) and the values of the topmost populated bitplane (digits) for approximating the further transform coefficients.

Figure 5:
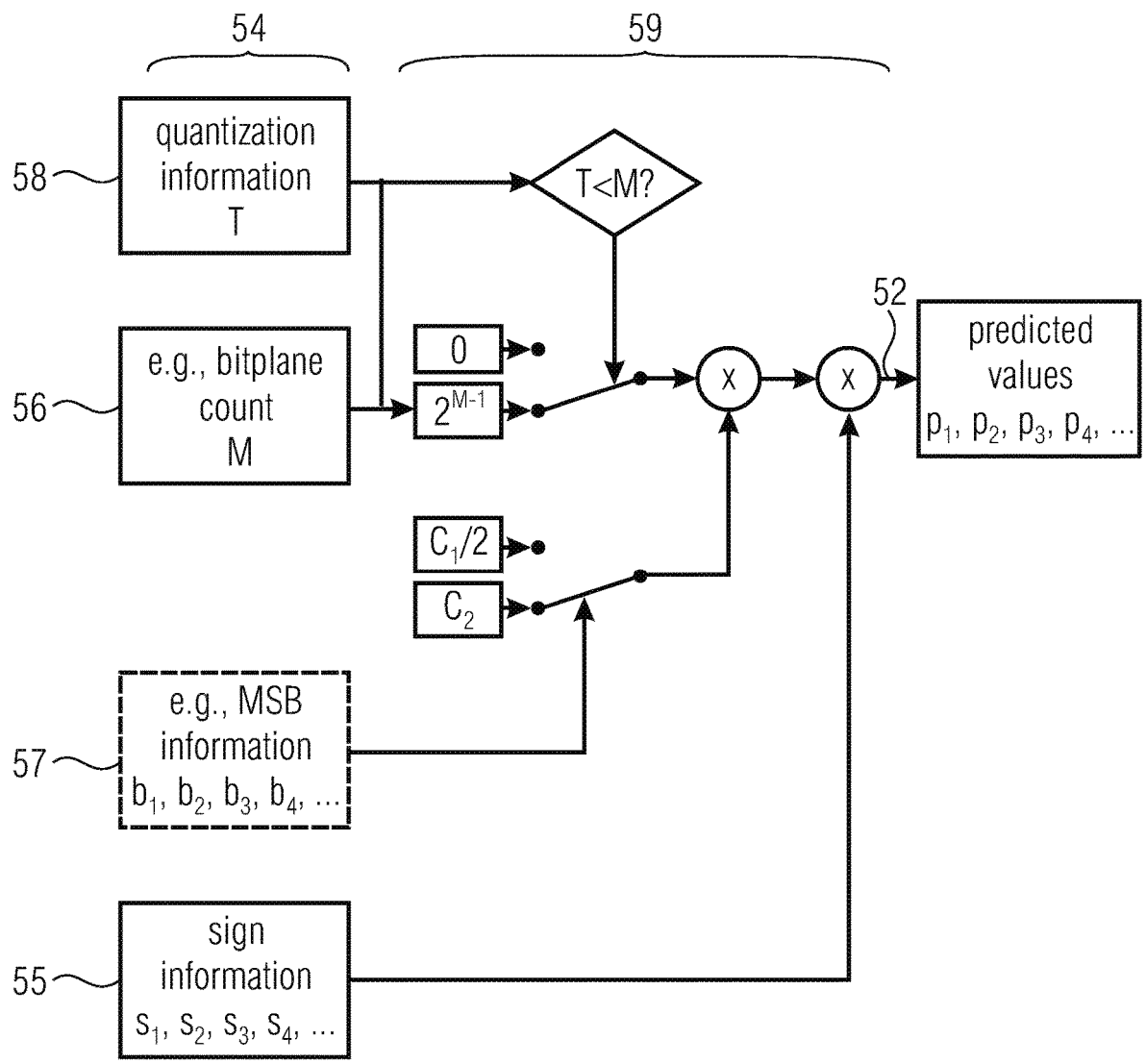
FIG. 5 illustrates an operation scheme for the buffering module according to an embodiment.

According to an embodiment, the buffering module 51 buffers, for each of the further transform coefficients of the coefficient group, a value of a bit of the binary representation of the absolute value, which bit has the significance indicated by the maximum significance 76* (e.g. information 57 in FIG. 5).

For example, in FIG. 4, the buffering module 51 may buffer the values of the bits, for which explicit values are indicated in FIG. 4, namely for coefficient group $72_1$ the bits of bitplane $76_3$, which is the highest significant bitplane, and for coefficient group $72_2$ the bits of bitplane $76_4$, which is the highest significant bitplane of coefficient group $72_2$.

Buffering the bit values of the highest significant bitplane additionally to the sign and the maximum significance 76* improves an accuracy of the approximations of the further transform coefficients. It is noted, that in examples, the accuracy may be further improved by buffering the values of one or more additional bitplanes, e.g. the next lower bitplane below the highest significant bitplane.

According to an embodiment, the buffering module 51 buffers the values of one or more bits having a significance equal to or higher than a predetermined significance, and refrains from buffering, or discards, bits of the binary representation, which are less significant than a predetermined significance. For example, the predetermined significance is the significance indicated by the maximum significance 76*, so that out of the bit values of a binary number representing the absolute value of the further transform coefficient, only the value of the bit having the significance indicated by the maximum significance 76* is buffered.

For example, according to embodiments in accordance with JPEG XS, entropy coding separates data in each band into code groups, then separates the quantized data into bitplanes (i.e. represents them in binary), and determines for each code group the number of populated bitplanes, from least significant bitplane to the topmost non-zero bitplane. This bitplane count information is part of the JPEG XS transport stream.

Accordingly, embodiments of the invention provide a method for compressing data in a frame buffer for temporal prediction of wavelet coefficients. While traditional designs store image data in a frame buffer as reference data for prediction of future frames, in embodiments of the invention, wavelet coefficients of a wavelet-based video compression may be stored in lossy compressed form. Instead of storing the coefficient directly, requiring, e.g., 16 bit per coefficient, only the log 2 of the common magnitude, the signs and the values of the topmost bitplane of groups of four coefficients may be stored, e.g. as described with respect to FIG. 4, requiring, e.g., only 12 bit per coefficient quadrupel. From this data, approximate coefficient values for temporal prediction are reconstructed, e.g. as described below with respect to FIG. 5, lowering storage requirements for the frame buffer and lowering the bandwidth requirements between processing unit and external memory containing the frame buffer.

FIG. 5 illustrates an operation scheme for the buffering module 51 according to an embodiment, in which the coefficients are coded in coefficient groups, e.g. as described before. Buffering module 51 buffers, for deriving the buffered transform signal approximation 52, buffered information 54 from the further transform signal 22*. Information 54 comprises, for each approximation of one or the further transform coefficients to be buffered, the indication 55 of the sign, and the maximum significance 76* of the coefficient group to which the further transform coefficient belongs. Further, the buffered information 54 may comprise a quantization information 58 (e.g. the indication of the quantization parameter described with respect to FIGS. 6 to 8) about a quantization threshold, or quantization parameter, used for a quantization in the encoding 70/decoding 71 of the further transform coefficients. For example, the quantization information 58 may be equal for all coefficients of one spectral component, e.g. one of the transformed representations of FIG. 3, or for all coefficients of one block of the transform signal, so that the quantization information may be stored per spectral component or per block. Optionally, the buffered information 54 may further comprise a bit value information 57 on the value of the bit having the maximum significance 76*.

According to the embodiment of FIG. 5, the buffering module 51 may derive the buffered approximation, e.g. $p_1$ in FIG. 5, for one of the further transform coefficients, by checking, if, according to the maximum significance 76* for the buffered approximation, the magnitude of the further transform coefficient is insignificant in view of the quantization information 58. For example, buffering module 51 may check, if the bitplane count M is below the quantization threshold T. If the magnitude is insignificant (e.g. the bitplane count M is below the quantization threshold T), buffering module 51 may set the value of the buffered approximation in the buffered transform signal 52 to a predetermined value. For example, in case the residual combiner 31 performs a summation, the predetermined value may be zero. If checking the quantization information yields, that the magnitude is not insignificant, the buffering module may set the value of the buffered approximation in dependence on the sign information 55 and the maximum significance 76*, e.g. set the value for $p_1$ to $s_1$ C×$2^{M-1}$, where Si represents the sign of the associated further transform coefficient, M is the bitplane count or the maximum significance 76*, and approximation parameter C is a statistical of empirical parameter, e.g. representing an average value. In examples, C may depend on M. C may also be referred to as reconstruction parameter.

In cases in which the buffered information includes the bit value information 57, the buffering module 51 may set the value for the buffered approximation in dependence on the value of the bit having the maximum significance 76*, e.g. $b_1$ for $p_1$ in FIG. 5. For example, the buffering module may set $p_1$ to $C_1 \times 2^{M-1}$ for coefficients whose topmost bitplane is stored as 1, and to $C_2 \times 2^{M-2}$ for coefficients whose topmost bitplane is stored as 0. $C_1$ and $C_2$ may be referred to as approximation parameters or reconstruction parameters, and may be statistical or empirical values. In examples, $C_1$ and $C_2$ may depend on M.

In other words, for example, if the bitplane count is not below the quantization threshold, an intermediate prediction p' is formed from the number of populated bitplanes M, p' being equal to $C_1 \times 2^{M-1}$ for coefficients whose topmost bitplane is stored as 1, and equal to $C_2 \times 2^{M-2}$ for coefficients whose topmost bitplane is stored as 0. The final prediction value is then given by s×p', where s is the stored sign bit. According to an embodiment, the reconstruction parameters are $C_1=C_2=3/8$.

It is noted, that the usage of the approximation parameter is independent of the specific implementation according to FIG. 5, but may also be used in combination with any of the previous embodiments.

Continuing with the description of the encoder 10 and decoder 11 according to FIG. 1 and FIG. 2, optionally being implemented in accordance with any of the embodiments described with respect to FIGS. 3 to 5, as already mentioned, according to embodiments, the buffering module 51 may selectively buffer approximations of the further transform coefficients in dependence on the spectral component which they represent, or, in other words, the buffering module 51 may buffer, for the buffered transform signal approximation 52, approximations of a selection of further transform coefficients, which represents a selection out of spectral components of the picture.

For example, out of the further transform coefficients of the transformed picture 24 illustrated in FIG. 3, the buffering module 51 may buffer approximations of the further transform coefficients of a selection, or a subset, of the transformed representations 25. For example, the buffering module 51 may buffer approximations of the further transform coefficients representing a first spectral component, e.g. the further transform coefficients of the transformed representation 255, and may refrain from buffering approximations of the further transform coefficients representing a second spectral component, e.g. the further transform coefficients of the transformed representations 251.

In other words, the buffering module 51 may derive the buffered transform signal approximation 52 for the coefficients representing the second spectral component independent of the further transform signal, e.g. by setting these coefficients in the buffered transform signal approximation 52 to a predetermined value, e.g. zero. Alternatively, these coefficients may be treated as having the predetermined value in the residual forming 30 and the residual combining 31. Not buffering high-frequency components may efficiently reduce the required buffer size compared to buffering approximations for the entire transformed picture, at a comparably small cost on the side of the rate-distortion relation. Accordingly, by selectively buffering the further transform coefficients, the buffer requirements for the temporal prediction of the transform signal may be reduced.

For example, encoder 10 may provide an indication of the selection of spectral components, for which the approximations are to be buffered, in the data stream 14, and decoder 11 may derive the selection from the data stream. For example, the selection may be signaled per picture, i.e. relate to the entire picture. Alternatively, in embodiments, in which the transform signal, e.g. the transformed representations are subdivided into portions, in units of which the transformed picture is coded into the data stream 14, the indication may be signaled per portion of the transformed picture.

Accordingly, in an embodiment, the buffered transform signal approximation 52 comprises, for each transform coefficient of the transform signal 22, a corresponding buffered transform coefficient, wherein buffered transform coefficients associated with spectral components not comprised in the selection of spectral components may be set to a predetermined value, e.g. zero. In an alternative embodiment, the buffered transform signal approximation 52 only comprises buffered transform coefficients associated with spectral components comprised in the selection of spectral components. According to this alternative, the residual combiner 31 determines the transform coefficients, which correspond to buffered transform coefficients associated with spectral components not comprised in the selection of spectral components, by taking over the values of mutually corresponding residual transform coefficients of the residual transform signal 32.

Figure 6:
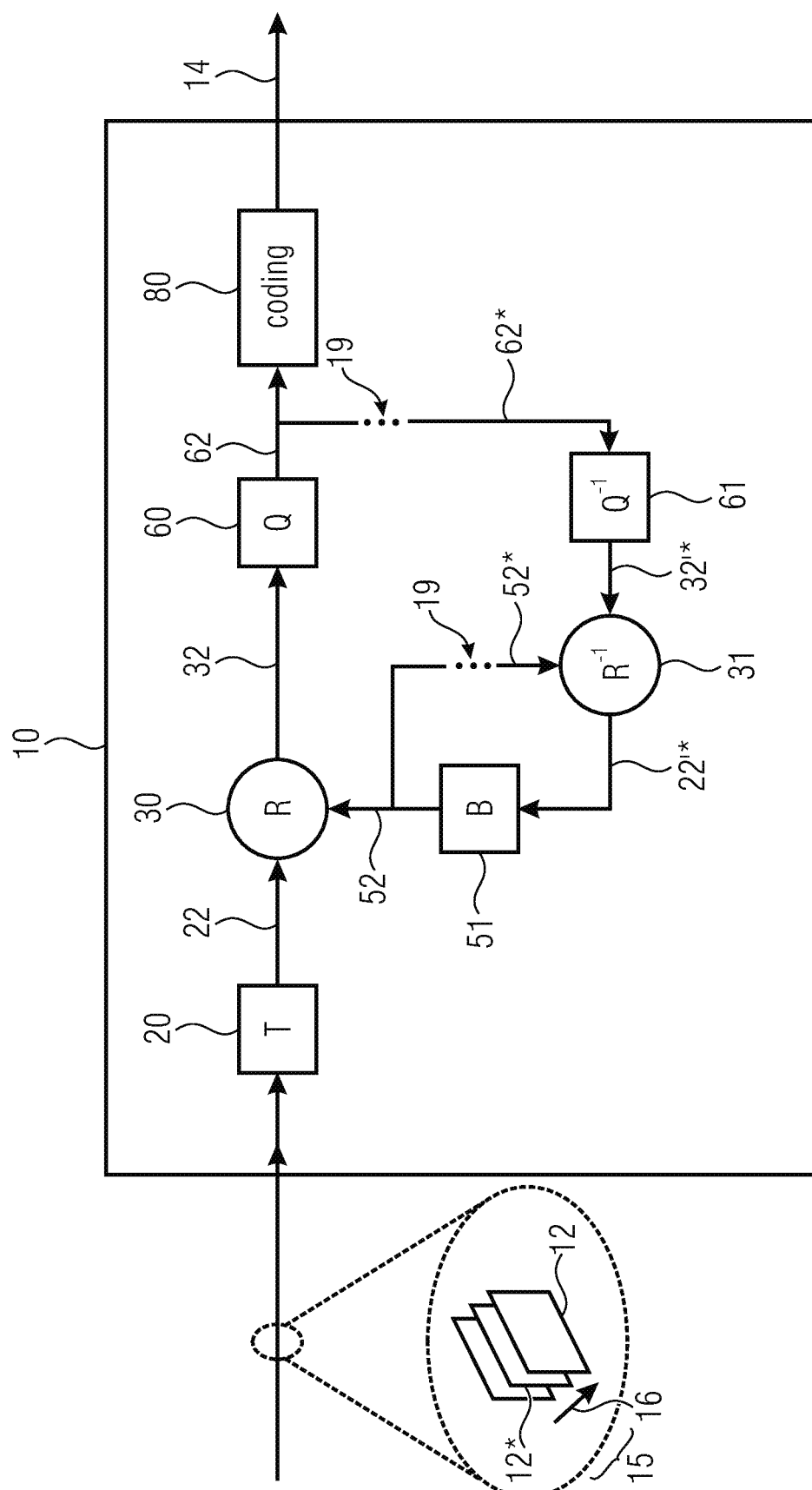
FIG. 6 illustrates an encoder according to another embodiment.

FIG. 6 illustrates another example of the encoder 10 according to an embodiment. According to this embodiment, the encoder 10 comprises a residual combiner 31 configured for combining the further residual transform signal of the previous picture, indicated using reference sign 32'* in FIG. 6, with the above mentioned further buffered transform signal approximation, which is indicated using reference sign 52*, so as to obtain a reconstructed transform signal 22'* of the previous picture. The reconstructed transform signal 22'* may correspond to the further transform signal of the previous picture despite of coding loss. The reconstructed transform signal 22'* may correspond to the further transform signal 22'* described before, but may differ from the further transform signal 22*, as provided by transform module 20, in terms of coding loss. Residual combiner 31 of encoder 10 may correspond to the residual combiner 31 of decoder 11, i.e. performs the same operation on its input signals as described with respect to decoder 11. Buffering module 51 receives the reconstructed transform signal 22'* and provides the buffered transform signal 52, e.g. as described with respect to the buffering module 51 of decoder 11.

Accordingly, as can be seen from FIG. 6, encoder 10 may encode the previous picture by subjecting a spatial representation of the previous picture 12*, referred to as further spatial representation, to the spatial-to-spectral transformation performed by transform module 20, such providing the further transform signal 22*. Residual former 30 may derive a further residual transform signal based on a further buffered transform signal 52* of the even further previous picture of the sequence and the further transform signal, and encoder 10 may derive the buffered transform signal 52 from the further residual transform signal.

According to an embodiment, the encoder 10 comprises a quantizer 60, configured for quantizing the residual transform signal 32 of the picture 12, so as to obtain a quantized signal 62. In the same manner, quantizer 60 may quantize the further residual transform signal of the previous picture 12*, so as to provide a further quantized signal 62*. A quantization step size or a quantization model used by quantizer 60 for quantization may be described by a quantization parameter. According to this embodiment, encoder 10 and decoder 11 comprise a dequantizer 61. The dequantizer 61 scales, or dequantizes, the further quantized signal 62* so as to obtain a dequantized further residual signal 32'*, which is provided to the residual combiner 31. As the dequantized further residual signal 32'* may correspond to the further residual transform signal of the previous picture 12*, as provided by the residual former 30, despite of coding loss introduced by the quantization and dequantization, the dequantized further residual transform signal 32'* may also be referred to as further residual transform signal 32'*, as done, e.g. above in the description of the residual combiner 31 of encoder 10. In other words, in embodiments which include the quantizer 60 and the dequantizer 61, the further residual transform signal 32* provided to residual combiner 31 is provided by dequantizer 61 and may include quantization loss.

According to an embodiment, the encoder 10 comprises encoding module 80, configured for encoding the quantized signal 62 into the data stream 14. For example, the encoding module 80 may encode the quantized signal 62 using entropy coding, e.g. using a bounded code as in JPEG XS. Forming residuals by means of residual former 30, at least of parts of the transform coefficients, and quantizing the residual transform signal 62 may result in a high number quantization levels having the value zero in the quantized signal 62, so that entropy coding may result in a high compression rate.

In other words, wavelet transformed data, e.g. the residual transform signal obtained from the transform signal 22, may be quantized to limited precision, removing irrelevant image content and creating many 0 coefficients. The quantized data may be entropy coded. Due to quantization of many coefficients into 0s, entropy coding can represent the quantized data efficiently using less bits than in the original image, allowing for compact storage and transmission.

Figure 7:
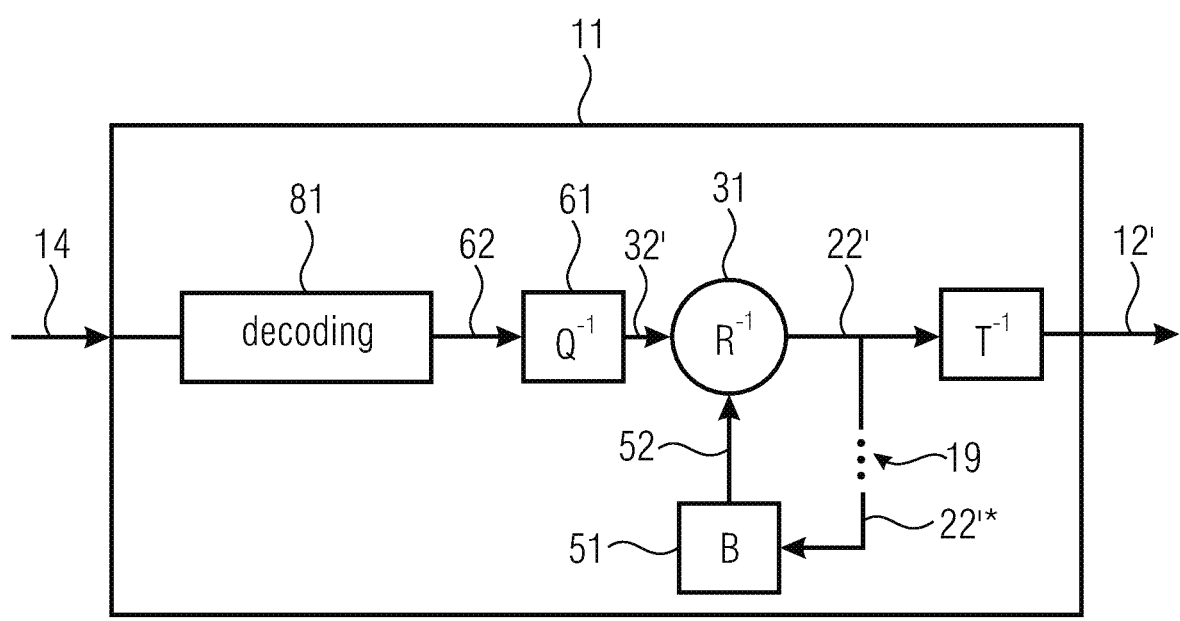
FIG. 7 illustrates a decoder according to another embodiment.

FIG. 7 illustrates an example of the decoder 11 according to an embodiment, which is in accordance with examples of the encoder 10 of FIG. 6. In particular, decoder 11 of FIG. 7 may comprise the dequantizer 61, e.g. as described above, configured for dequantizing the quantized signal 62 so as to provide the residual transform signal 32', which, according to this embodiment, may deviate from the residual transform signal 32 by quantization loss.

According to an embodiment, decoder 11 further comprises decoding module 81, configured for deriving or decoding the quantized signal 62 from the data stream, e.g. using entropy decoding, e.g. using a bounded code as in JPEG XS.

For example, quantizer 60 and encoding module 80 may be part of the encoding module 70 of FIG. 1, and dequantizer 61 and decoding module 81 may be part of the decoding module 71 of FIG. 2. It is noted that the decoding module 71 may perform the backward operation of the operation of the decoding module 71, which may in particular apply to the quantization and entropy coding steps.

According to an embodiment, the buffering module 51 buffers, for each of the buffered approximations, an indication of the quantization parameter used for the further transform coefficient, e.g. in quantizing 60 and dequantizing 61 the further transform coefficient. For example, the buffering module 51 may consider the quantization parameter in deriving the buffered transform signal approximation by disregarding the information buffered for an approximation of a further transform coefficient, if an approximated magnitude of the further transform coefficient indicated by the buffered information, e.g. the maximum significance 76*, is insignificant in view of the quantization parameter.

As already mentioned with respect to FIG. 5, according to an embodiment, buffering module 51 derives the buffered transform signal approximation 52 by setting one of the approximations of further transform coefficients to a predetermined value, e.g. zero, if the maximum significance 76*, e.g. as described with respect to FIG. 4, indicated for the approximation indicates that the approximation is insignificant in view of the quantization parameter.

Figure 8:
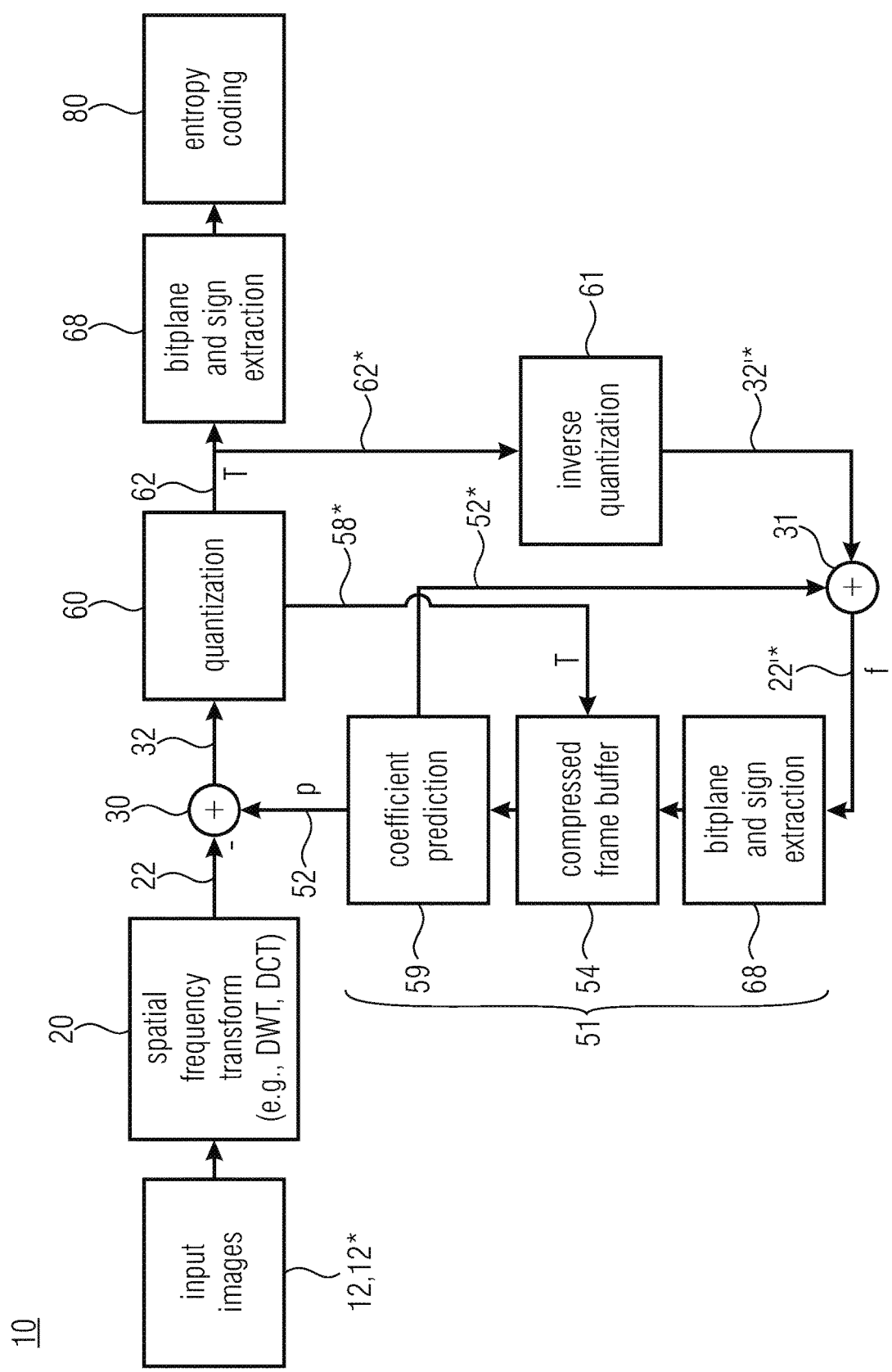
FIG. 8 illustrates an encoder according to another embodiment.

FIG. 8 illustrates another embodiment of the encoder 10, which may optionally correspond to embodiments described with respect to FIG. 1 and FIG. 6. Incoming data of the previous picture is wavelet transformed 20, and data in the compressed frame buffer, consisting of quantization step sizes, bitplane count, sign bit and topmost bitplane information of an even further previous picture is used to generate coefficient predictions p, e.g. as described with respect to FIG. 5. The prediction residual p is subtracted, e.g. by residual former 30, from the transformation coefficient of the incoming data 22 and forms prediction residuals 32. These residuals are then quantized. The quantized data r is separated into bitplane counts, sign bits and bitplane data, all of which are then entropy coded.

To update the compressed frame buffer 54, the quantized prediction residuals 62* (e.g. of the previous picture) are inversely quantized 61 and added 31 to the prediction data p of the same frame 52*, resulting in coefficients f, e.g. the further transform signal 22'*. Note that these coefficients f are identical to what a decoder would reconstruct from the incoming entropy coded data and its own frame buffer.

The data f then undergoes separation into sign bits s, bitplane counts M and bitplane data b, e.g. performed by a binarization module 68. While this separation into signs, bitplane counts and bitplane data uses the same algorithm as that used for entropy coding and thus may, e.g., follow the layout of FIG. 4, the compressed data in the frame buffer will be different from r as it does not represent prediction residuals. The compressed data along with the quantization step size 58* used for quantizing the residual of the previous picture is stored in the frame buffer, and then used for the prediction 30 of the incoming coefficients of the current frame.

As can be seen in FIG. 8, unlike conventional designs, e.g. as explained with respect to FIG. 9, the embodiments of the invention perform temporal prediction after spatial decorrelation (the spatial-to-spectral transform 20) but before quantization 60. In particular, a discrete wavelet transformation ("DWT") may be applied as first step, creating a cascade of wavelet bands such as seen in FIG. 3, and temporal prediction is applied within these bands, i.e. in the wavelet domain and not in the spatial domain. While the frame buffer in typical video coding schemes such as H.261 and later standards contain image data, here, it may, for example, consist only of four data items for each coding group, namely for each coefficient group in each wavelet band, e.g. as described with respect to FIG. 4 and FIG. 5: the number of populated bitplanes, e.g. the maximum significance, which may also be required by the entropy encoder 80 and, in decoder 11, be available from the entropy decoder 81; for each coefficient in each code group, its sign; for each wavelet band, the used quantization; and optionally, for each coefficient in each code group, the value of the topmost populated bitplane according to the first data item.

For example, for the exemplary layout of FIG. 4, according to an embodiment, the data 54 stored for the first coding group $72_1$ may be (3, +−++, 0110), and the data stored for the second coding group $72_2$ may be (4, ++−−, 0111). Since the number of populated bitplanes may vary, for example, between 0 and 15, and storage of the other information requires one bit per coefficient, this makes up a total information content of 4+4+4=12 bits per coding group, whereas storing the coefficient values directly requires 16+16+16+16=64 bit, a reduction by a factor of over $\frac{1}{5}^{th}$, or a factor of $\frac{1}{8}^{th}$ if only the bitplane count and the sign bits are stored. The quantization information 58 may, for example, be stored using 15 bits per wavelet band and is therefore negligible.

FIG. 9 illustrates an example of an alternative example of a coding scheme, with respect to which advantages of the present invention above some existing video coding schemes are discussed in the following. Examples of typically used Video Codecs are as H.261, H.264 (AVC) or H.265 (HEVC). In such schemes, data first undergoes a temporal decorrelation, e.g. by creating difference data between a predicted frame and the original frame, then the image is segmented into blocks, and on these blocks a spatial decorrelation transformation, such as a discrete cosine transformation ("DCT"), or a discrete sine transformation ("DST") is run. Typically, this prediction also includes an estimation of the motion in the original data, and then predicts from the motion-compensated data only. Note that schemes such as H.261 also could work without estimating any motion if this step is too complex.

It is important to note, however, that the above schemes all perform temporal prediction before spatial decorrelation (i.e. the spatial decorrelation transformation runs across temporally predicted data), that the frame buffer is the same size as that of the original image, and that the I frame includes data for a full refresh.

Temporal prediction typically follows a "closed loop" design, that is, the encoder includes a model of the decoder, allowing it to predict exactly which output a decoder would generate, and it performs its temporal prediction on this predicted output. Without such a closed-loop temporal prediction, the output of the actual encoder and the encoder-side frame buffer could slowly drift away, causing visible image distortions after a while. FIG. 10 depicts an overview on the steps of a traditional video coding scheme.

In contrast, embodiments of the present invention use a temporal prediction in the transform domain rather than spatial prediction in the transform domain.

Other codecs, such as JPEG XS, currently do not include mechanisms for temporal prediction and thus require bandwidths that are too high for some applications.

Compared to the methods for temporal prediction in the video coding standards H.261 and following, in which the encoder and the decoder need to include memory to represent all data of a full frame, and need to provide the bandwidth between the actual processing unit and local storage ("RAM") on the encoder/decoder to retrieve the data from the past frame to enable temporal prediction, the proposed scheme provides the advantage, that a smaller size of the local storage may be sufficient, as the storage of the approximations may require less memory.

Further, as already mentioned, performing temporal prediction in the transform domain may be less complex than in the spatial domain. Hence, over the methods for bandwidth reduction employed in H.261 and related video coding standards, embodiments of the invention may be performed with lower complexity in terms of the number of algorithmic steps to be taken to carry out the prediction, a smaller frame buffer as it may be advantageous for some designs, and a smaller memory bandwidth towards the frame buffer, as it may be compliant with some target architectures.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus. In particular, it is pointed out, that the block diagrams of FIGS. 1, 2, 5, 6, 7, and 8, using which the encoders and decoder are described, may also be understood as block diagrams describing corresponding methods for encoding and decoding.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the video bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

The invention claimed is:

1. An apparatus for decoding a sequence of pictures from a data stream, wherein the apparatus is configured for
   decoding a picture of the sequence by
   deriving a residual transform signal of the picture from the data stream,
   combining the residual transform signal with a buffered transform signal approximation of a previous picture of the sequence so as to acquire a transform signal representing the picture, the transform signal comprising a plurality of transform coefficients, and
   subjecting the transform signal to an inverse wavelet transformation or an inverse frequency transformation, and
   deriving the buffered transform signal approximation from a further transform signal representing the previous picture so that the buffered transform signal approximation comprises approximations of further transform coefficients of the further transform signal.

2. The apparatus according to claim 1, wherein the apparatus is configured for buffering, for each of the approximations of the further transform coefficients, an indication of a sign of a binary representation of the further transform coefficient.

3. The apparatus according to claim 1, wherein the apparatus is configured for decoding the further transform coefficients in units of coefficient groups, each coefficient group comprising a plurality of the further transform coefficients, and
   wherein the apparatus is configured for deriving the buffered transform signal approximation by buffering, for one of the coefficient groups, an indication of a maximum significance out of respective significances of the significant bits of binary representations of absolute values of the further transform coefficients of the coefficient group.

4. The apparatus according to claim 3, wherein the apparatus is configured for buffering, for each of the approximations of the further transform coefficients of the coefficient group, a value of a bit of the binary representation of the absolute value of the further transform coefficient, which bit comprises the significance indicated by the maximum significance.

5. The apparatus according to claim 4, wherein the apparatus is configured for determining the approximation of one of the further transform coefficients in dependence on an approximation parameter, wherein the approximation parameter depends on the value of the bit of the binary representation of the absolute value of the further transform coefficient, which bit comprises the significance indicated by the maximum significance.

6. The apparatus according to claim 1, wherein the apparatus is configured for decoding the previous picture by
  decoding a further residual transform signal from the data stream,
  combining the further residual transform signal with a further buffered transform signal approximation of an even further previous picture of the sequence so as to acquire the further transform signal representing the previous picture, the further transform signal comprising the further transform coefficients, and
  subjecting the further transform signal to an inverse wavelet transformation or an inverse frequency transformation so as to acquire a spatial representation of the previous picture.

7. The apparatus according to claim 1, wherein each of the further transform coefficients is represented by a binary representation, and wherein the apparatus is configured for, in deriving the buffered transform signal approximation, discarding bits of the binary representation, which are less significant than a predetermined significance of the binary representation.

8. The apparatus according to claim 1, wherein the apparatus is configured for
  deriving the residual transform signal from the data stream by
  deriving a plurality of quantized residual transform coefficients from the data stream, and
  scaling the quantized residual transform coefficients based on a quantization parameter for deriving residual transform coefficients for the residual transform signal, and
  deriving the buffered transform signal approximation by setting one of the approximations of further transform coefficients to a predetermined value, if a maximum significance indicated for the approximation indicates that the approximation is insignificant in view of the quantization parameter.

9. The apparatus according to claim 8, wherein the apparatus is configured for buffering, for each of the approximations of the further transform coefficients, an indication of the quantization parameter used for the further transform coefficient.

10. The apparatus according to claim 1, wherein the apparatus is configured for combining the residual transform signal with the buffered transform signal approximation by combining mutually corresponding residual transform coefficients of the residual transform signal and approximations of the further transform coefficients included in the buffered transform signal approximation.

11. The apparatus according to claim 1, configured for subjecting the transform signal to an inverse discrete wavelet transformation.

12. The apparatus according to claim 1, configured for buffering, for the buffered transform signal approximation, approximations of a selection of further transform coefficients, which represents a selection out of spectral components of the picture.

13. The apparatus according to claim 12, configured for combining the residual transform signal with the buffered transform signal approximation by
  combining mutually corresponding residual transform coefficients of the residual transform signal and approximations of the further transform coefficients belonging to the selection of spectral components, and
  determining transform coefficients which belong to spectral components not comprised in the selection of spectral components by taking over the values of mutually corresponding residual transform coefficients of the residual transform signal.

14. An apparatus for encoding a sequence of pictures into a data stream, wherein the apparatus is configured for
  encoding a picture of the sequence by
  subjecting a spatial representation of the picture to a wavelet transformation or a frequency transformation so as to acquire a transform signal representing the picture, the transform signal comprising a plurality of transform coefficients,
  deriving a residual transform signal based on a buffered transform signal approximation of a previous picture of the sequence and the transform signal, and
  encoding the residual transform signal of the picture into the data stream, and
  deriving the buffered transform signal approximation from a further transform signal representing the previous picture so that the buffered transform signal approximation comprises approximations of further transform coefficients of the further transform signal.

15. The apparatus according to claim 14, wherein the apparatus is configured for buffering, for each of the approximations of the further transform coefficients, an indication of a sign of a binary representation of the further transform coefficient.

16. The apparatus according to claim 14, wherein the apparatus is configured for encoding the further transform coefficients in units of coefficient groups, each coefficient group comprising a plurality of the further transform coefficients, and
  wherein the apparatus is configured for deriving the buffered transform signal approximation by buffering, for one of the coefficient groups, an indication of a maximum significance out of respective significances of the significant bits of binary representations of absolute values of the further transform coefficients of the coefficient group.

17. The apparatus according to claim 16, wherein the apparatus is configured for buffering, for each of the approximations of the further transform coefficients of the coefficient group, a value of a bit of the binary representation of the absolute value of the further transform coefficient, which bit comprises the significance indicated by the maximum significance.

18. The apparatus according to claim 17, wherein the apparatus is configured for determining the approximation of one of the further transform coefficients in dependence on an approximation parameter, wherein the approximation parameter depends on the value of the bit of the binary representation of the absolute value of the further transform coefficient, which bit comprises the significance indicated by the maximum significance.

19. The apparatus according to claim 14, wherein the apparatus is configured for encoding the previous picture by
  subjecting a further spatial representation of the previous picture to a wavelet transformation or a frequency transformation so as to acquire the further transform signal, the further transform signal comprising the further transform coefficients, deriving a further residual transform signal based on a further buffered transform signal approximation of an even further previous picture of the sequence and the further transform signal, and encoding the further residual transform signal into the data stream.

20. The apparatus according to claim 19, wherein the apparatus is configured for encoding the further residual transform signal by quantizing the further residual transform signal and encoding the quantized further residual transform signal into the data stream, and deriving the buffered transform signal approximation by setting one of the approximations of further transform coefficients to a predetermined value, if a maximum significance indicated for the approximation indicates that the approximation is insignificant in view of a quantization parameter of the quantization of the further residual transform signal.

21. The apparatus according to claim 20, wherein the apparatus is configured for buffering, for each of the approximations of the further transform coefficients, an indication of the quantization parameter used for the further transform coefficient.

22. The apparatus according to claim 19, wherein the apparatus is configured for deriving the buffered transform signal approximation by scaling the further residual transform signal, and combining the scaled further residual transform signal with the further buffered transform signal approximation so as to acquire a reconstructed transform signal of the previous picture, the reconstructed transform signal comprising reconstructed transform coefficients, and buffering approximations of the reconstructed transform coefficients so as to acquire the approximations of the further transform coefficients for the buffered transform signal approximation.

23. The apparatus according to claim 14, wherein each of the further transform coefficients is represented by a binary representation, and wherein the apparatus is configured for deriving the buffered transform signal approximation by discarding bits of the binary representation, which are less significant than a predetermined significance of the binary representation.

24. The apparatus according to claim 14, wherein the apparatus is configured for deriving the residual transform signal by predicting transform coefficients of the transform signal using corresponding approximations of the further transform coefficients included in the buffered transform signal approximation.

25. The apparatus according to claim 14, configured for subjecting the spatial representation of the picture to a discrete wavelet transformation.

26. The apparatus according to claim 14, configured for buffering, for the buffered transform signal approximation, approximations of a selection of further transform coefficients, which represents a selection out of spectral components of the picture.

27. The apparatus according to claim 26, configured for deriving the residual transform signal by determining residual transform coefficients which belong to the selection of spectral components based on mutually corresponding transform coefficients and approximations of the further transform coefficients, and determining transform coefficients which belong to spectral components not comprised in the selection of spectral components by taking over the values of mutually corresponding residual transform coefficients of the residual transform signal.

28. A method for decoding a sequence of pictures from a data stream, wherein the method comprises decoding a picture of the sequence by deriving a residual transform signal of the picture from the data stream, combining a residual transform signal with a buffered transform signal approximation of a previous picture of the sequence so as to acquire a transform signal representing the picture, the transform signal comprising a plurality of transform coefficients, and subjecting the transform signal to an inverse wavelet transformation or an inverse frequency transformation, and deriving the buffered transform signal approximation from a further transform signal representing the previous picture so that the buffered transform signal approximation comprises approximations of further transform coefficients of the further transform signal.

29. A method for encoding a sequence of pictures into a data stream, wherein the method comprises encoding a picture of the sequence by subjecting a spatial representation of the picture to a wavelet transformation or a frequency transformation so as to acquire a transform signal representing the picture, the transform signal comprising a plurality of transform coefficients, deriving a residual transform signal based on a buffered transform signal approximation of a previous picture of the sequence and the transform signal, and encoding the residual transform signal of the picture into the data stream, and deriving the buffered transform signal approximation from a further transform signal representing the previous picture so that the buffered transform signal approximation comprises approximations of further transform coefficients of the further transform signal.

30. A non-transitory digital storage medium having a computer program stored thereon to perform the method for decoding a sequence of pictures from a data stream, wherein the method comprises decoding a picture of the sequence by deriving a residual transform signal of the picture from the data stream, combining a residual transform signal with a buffered transform signal approximation of a previous picture of the sequence so as to acquire a transform signal representing the picture, the transform signal comprising a plurality of transform coefficients, and subjecting the transform signal to an inverse wavelet transformation or an inverse frequency transformation, and deriving the buffered transform signal approximation from a further transform signal representing the previous picture so that the buffered transform signal approximation comprises approximations of further transform coefficients of the further transform signal, when said computer program is run by a computer.

31. A non-transitory digital storage medium having a computer program stored thereon to perform the method for encoding a sequence of pictures into a data stream, wherein the method comprises encoding a picture of the sequence by subjecting a spatial representation of the picture to a wavelet transformation or a frequency transformation so as to acquire a transform signal representing the picture, the transform signal comprising a plurality of transform coefficients, deriving a residual transform signal based on a buffered transform signal approximation of a previous picture of the sequence and the transform signal, and encoding the residual transform signal of the picture into the data stream, and deriving the buffered transform signal approximation from a further transform signal representing the previous picture so that the buffered transform signal approximation comprises approximations of further transform coefficients of the further transform signal, when said computer program is run by a computer.

32. A non-transitory computer-readable medium having stored thereon a data stream having encoded thereinto a sequence of pictures, wherein the sequence of pictures is encoded into the data stream using the method for encoding a sequence of pictures into a data stream, wherein the method comprises encoding a picture of the sequence by subjecting a spatial representation of the picture to a wavelet transformation or a frequency transformation so as to acquire a transform signal representing the picture, the transform signal comprising a plurality of transform coefficients, deriving a residual transform signal based on a buffered transform signal approximation of a previous picture of the sequence and the transform signal, and encoding the residual transform signal of the picture into the data stream, and deriving the buffered transform signal approximation from a further transform signal representing the previous picture so that the buffered transform signal approximation comprises approximations of further transform coefficients of the further transform signal.

* * * * *